United States Patent [19]

Lescoche

[11] Patent Number: 5,554,282

[45] Date of Patent: Sep. 10, 1996

[54] INORGANIC MEMBRANE FILTRATION UNIT

[75] Inventor: Philippe Lescoche, Nyons, France

[73] Assignee: T.A.M.I. Industries (Societe Anonyme), Nyons, France

[21] Appl. No.: 244,616

[22] PCT Filed: Oct. 7, 1993

[86] PCT No.: PCT/FR93/00994

§ 371 Date: Jun. 6, 1994

§ 102(e) Date: Jun. 6, 1994

[87] PCT Pub. No.: WO94/08705

PCT Pub. Date: Apr. 28, 1994

[30] Foreign Application Priority Data

Oct. 9, 1992 [FR] France .................................. 92 12379

[51] Int. Cl.$^6$ ...................................................... B01D 25/02
[52] U.S. Cl. .................... 210/321.75; 210/346; 210/486; 210/490; 210/496; 210/500.25; 210/500.26; 210/510.1
[58] Field of Search ..................................... 210/226, 228, 210/343, 344, 346, 486, 490, 321.75, 321.84, 500.25, 500.26, 510.1, 496

[56] References Cited

U.S. PATENT DOCUMENTS 4,069,157  1/1978  Hoover .............................. 210/510.1

FOREIGN PATENT DOCUMENTS

| 259109 | 3/1988 | European Pat. Off. . |
| 2061934 | 6/1971 | France . |
| 2182612 | 12/1973 | France . |
| 2262550 | 9/1975 | France . |
| WO93/00154 | 1/1993 | WIPO . |

*Primary Examiner*—Matthew O. Savage
*Attorney, Agent, or Firm*—Bacon & Thomas

[57] ABSTRACT

The invention concerns an inorganic filtration unit for a liquid medium (2) with a view to recovering a filtrate, the unit comprising at least one inorganic, rigid, porous structure (A), presenting first ($a_1$) and second ($a_2$) principal faces opposite each other, at least one cavity (4) being arranged in the structure at a distance from the two faces, defining bearings (6), the cavity or the principal faces being coated with at least one separating layer (3). According to the invention, the porous structure (A) comprises at least one channel (8) with tight walls opening out on the two faces ($a_1$ and $a_2$) and arranged to traverse a bearing (6), with a view to constituting a first circulation network ($R_1$) tight with respect to the cavity (4).

10 Claims, 3 Drawing Sheets

INORGANIC MEMBRANE FILTRATION UNIT

TECHNICAL FIELD

The present invention relates to the technical field of the molecular or particulate separation using separation elements, generally called membranes and constituted from inorganic materials.

More particularly, the invention relates to an inorganic filtration unit adapted to concentrate, sort or extract, modular or particulate species contained in a liquid medium which exerts a given pressure on the membrane.

The object finds a particularly advantageous application in the field of nano-filtration, ultra-filtration, micro-filtration, filtration or reverse osmosis.

PRIOR ART

The prior art has proposed, in Patent FR 2 061 934, a filtration unit of inorganic nature constituted by stacked filtration elements. A first network of channels, parallel to one another, of circular section, is arranged on the opposite faces of two consecutive filtration elements. The surface of the channels is coated with a separating layer ensuring filtration of a liquid medium circulating inside the first network of channels. The filtration elements are arranged to comprise a second network of channels of circular section extending in a direction perpendicular to that of the channels of the first network. The channels of the second network are intended to recover the filtrate having passed through the filtration elements from the separating layers.

The channels of the two networks open out on the four sides of the filtration unit thus constituted. The sides of the unit are intended to receive plates arranged to comprise independent pipes for conducting the liquid medium to be treated and for recovering the filtrate, adapted to communicate respectively with the first and the second network of channels. The use of such plates presents drawbacks insofar as they necessitate a perfect seal between the four sides of the unit and the added plates. Moreover, the operation of assembly of the plates cannot be easily carried out during the process of manufacturing the unit, which prevents industrial manufacture of such a filtration unit. It must also be considered that the one-piece nature of such a module imposes that it be produced from a porous material. The performance of the module is thus reduced due to the thickness of the walls that it implies.

In the state of the art, Patent Application FR-A-2 262 550 also discloses a module intended for energy exchange and capable of being applied to the domain of filtration. Such a module is constituted from a one-piece porous element, inside which are arranged at least two independent networks of parallel layers of regularly intersecting channels. The channels of each network are connected together by pipes.

Such a module, which has been designed to constitute a heat exchanger, is unsuitable to perform a function of filtration.

Indeed, this module is made from a porous material, in the form of a one-piece element, leading to obtaining a low-performance module due to the thickness of the walls, which causes a considerable pressure drop. Furthermore, such a module may comprise reinforcing bridges forming continuities of matter and designed to join two opposite separating walls in order to increase the mechanical strength of the walls. The use of such reinforcing bridges reduces the capacity of filtration for the same surface of matter used.

SUMMARY OF THE INVENTION

The object of the present invention is to overcome the various drawbacks of the prior art by proposing an inorganic filtration unit designed, on the one hand, to comprise at least one and preferably two circulation networks tight with respect to each other, respectively for the liquid medium to be treated and the filtrate, and, on the other hand, to present an optimized capacity of filtration with respect to the volume of matter used.

It is also an object of the invention to provide an inorganic filtration unit designed to allow industrial manufacture integrating in its process of manufacture the production of the pipes for supplying the liquid to be treated and the pipes for recovering the filtrate.

To attain this object, the filtration unit according to the invention comprises at least one inorganic, rigid, porous structure presenting a first and a second principal face, opposite each other, at least one cavity being arranged in the porous structure at a distance from the two faces, defining bearings.

According to the invention, the porous structure comprises at least one channel with tight walls opening out on the two faces and arranged to traverse a bearing, with a view to constituting a first circulation network tight with respect to the cavity.

Various other characteristics will appear from the description made hereinbelow with reference to the accompanying drawings which show by way of non-limiting example, forms of embodiment of the object of the invention.

BEST WAY OF IMPLEMENTING THE INVENTION

Figure 1:
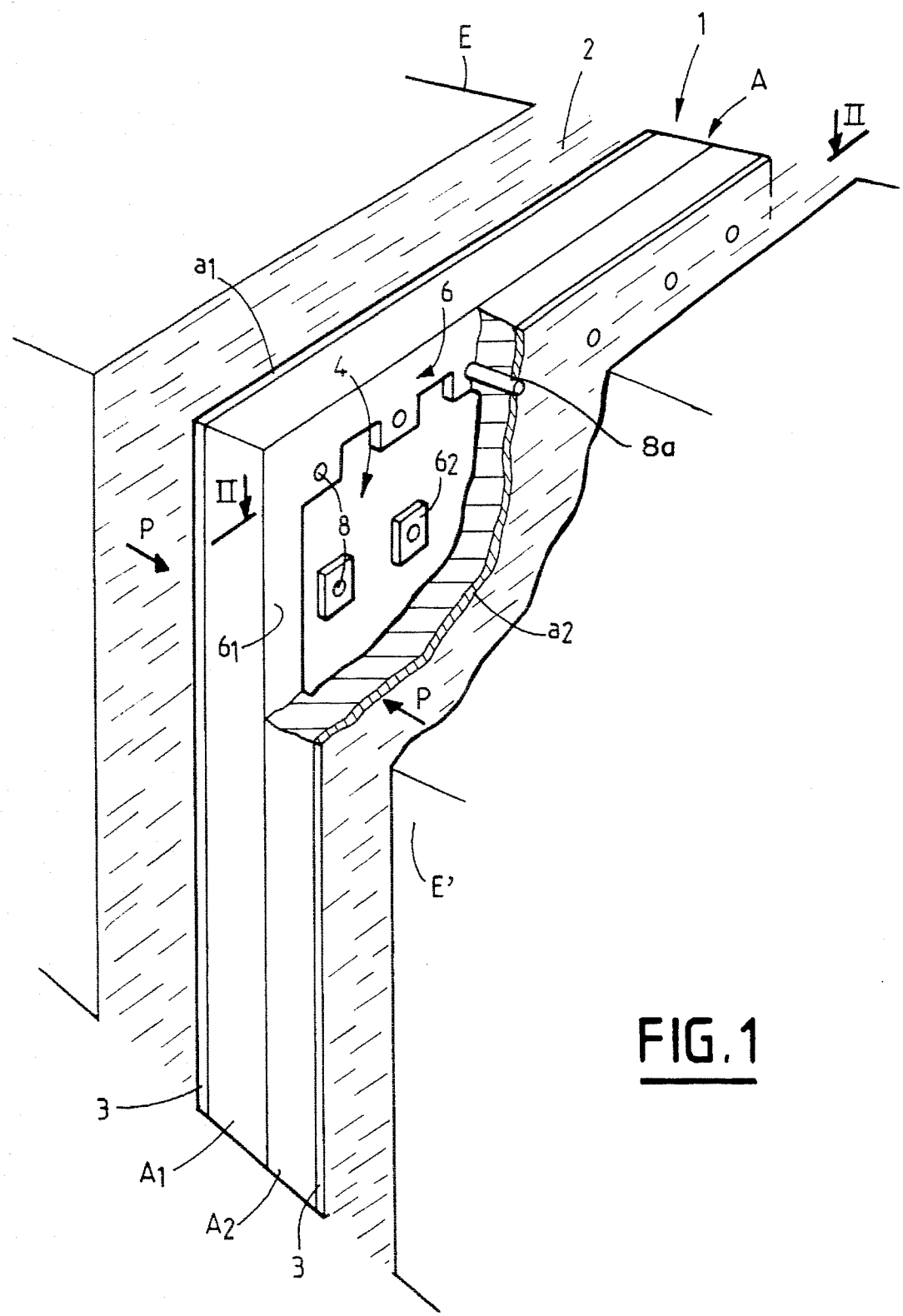
FIG. 1 is a view in perspective of a first embodiment of a filtration unit according to the invention.
Figure 2:
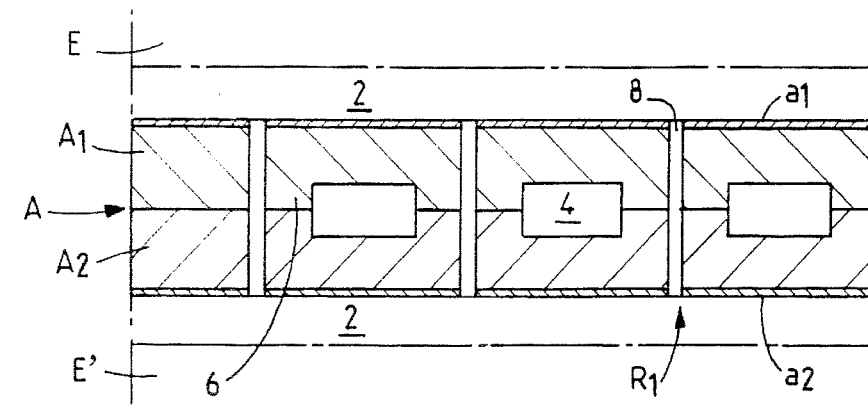
FIG. 2 is a view in section taken substantially along lines II—II of FIG. 1.

Referring now to the drawings, FIGS. 1 and 2 illustrate a first embodiment of an inorganic filtration unit 1 according to the invention, adapted to ensure separation or filtration of molecules or particles contained in a liquid medium 2, of diverse nature, comprising a solid, or not, phase. The filtration unit 1 is composed of at least one inorganic, rigid, porous structure A interposed between an end element E and an end counter-element E'.

The porous structure A has first $a_1$ and second $a_2$ principal faces opposite each other. In the example illustrated, each principal face $a_1$ and $a_2$ is coated with at least one separating layer 3 intended to be in contact with the liquid medium 2 which is established between these faces and the end elements E and E'. The nature of the separating layer or layers 3 is chosen as a function of the power of separation or of filtration to be obtained and forms with the porous structure A an intimate bond, so that the pressure P coming from the liquid medium 2 is transmitted to the porous structure A. It should be noted that, conventionally, the diameter of the pores of this or these layers 3 is considerably smaller than that of the porous structure. For example, the ratio of the diameter of porous structure A with respect to layers 3 may be deposited from, for example, suspensions containing at least one metal oxide and conventionally used in the production of the inorganic filtration elements. This layer or layers are subjected after drying to a sintering operation which makes it possible to consolidate them and bond them together and to the porous structure A.

As is more precisely visible in FIGS. 1 and 2, the porous structure A comprises means, such as a cavity 4 made at a distance from faces $a_1$ and $a_2$ and adapted to recover the filtrate having traversed the porous structure A from the separating layers 3. The cavity 4 is arranged so as to leave, in its plane of extension which is considered as parallel to faces $a_1$ and $a_2$, at least one bearing 6 ensuring a continuity of matter between the opposite faces $a_1$, $a_2$ of the porous structure A. In the example illustrated, in which the porous structure A is formed by two plates or the like $A_1$, $A_2$, the cavity 4 is made on at least one and preferably on the two faces, placed in register, of the plates $A_1$ and $A_2$.

According to a preferred form of embodiment, the bearing or bearings 6 are arranged to define the cavity 4 so as to constitute a peripheral border $6_1$ designed to ensure a perimetric contact surface between the two plates $A_1$ and $A_2$. The cavity 4 is thus confined within the porous structure A, opening out for example via passages, not shown, made at the level of the edges of the porous structure in order to recover the filtrate. In the case of symmetrical production of the two plates $A_1$ and $A_2$, the peripheral borders $6_1$ are in mutual contact and are used to allow the bond of the plates to each other via a bonding product such as a layer of glass or clay deposited on the borders and subjected to a heat treatment. It should be noted that one or more bearings $6_2$, of punctual nature, are made in order to perform a function which will be explained more precisely in the following description.

According to a feature of the invention, the bearing or bearings 6 are used to ensure production of at least one and generally a series of channels 8 opening out on the two faces $a_1$ and $a_2$ of the porous structure A, with a view to constituting a first network $R_1$ for circulation of the liquid medium 2, tight with respect to the cavity 4 for recovering the filtrate. The channels 8 are thus made to traverse the porous structure A right through, whilst being isolated from the cavity 4 by reason of their passage through the bearings 6. In order to avoid a mixture between the product to be treated and the filtrate via the porosity of the plates $A_1$, $A_2$, the channels 8 are rendered tight, or sealed, with the aid of a suitable product, identical, or not, to the one having served to bond the bearings 6 together. By way of example, the tightness of the channels 8 may be effected from a thermofusible polymer of fluorinated type or not, a resin, enamels or glasses. It should be noted that the walls of the channels 8 may be rendered tight, or sealed, with the aid of an added non-porous element such as a non-porous tube as shown at 8a in FIG. 1.

Figure 3:
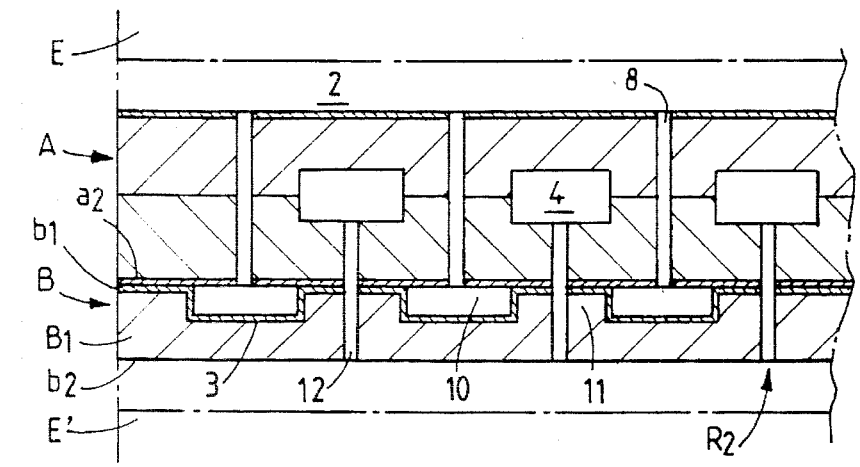
FIGS. 3 and 4 are views similar to FIG. 2 and showing other embodiments of a filtration unit according to the invention.

In accordance with another embodiment of the inorganic unit according to the invention, the rigid porous structure A is associated, on at least one of its faces, for example $a_2$, with at least one complementary inorganic, rigid, porous structure B. As is more precisely visible in FIG. 3, the porous structure B comprises a plate or the like $B_1$ of which one of its faces $b_1$ is coated with a separating layer 3. Such a face $b_1$ is intended to be in contact with the face $a_2$ of the structure A, defining therewith at least one chamber 10 made to communicate with the channels 8. The chamber 10 is made so as to leave, in its plane of extension parallel to the faces of the structure, at least one reinforcement or one bearing 11 forming a continuity of matter between the two opposite principal faces of the plate $B_1$.

The reinforcements 11 preferably form at least part of a peripheral border of the plate $B_1$, so as to allow confinement of the chamber 10 within the porous structure. According to a feature of the invention, the cavity 4 communicates with the outer face $b_2$ of the plate $B_1$ via at least one conduit 12 traversing the reinforcement cavity 4 for recovering the filtrate. The channels 8 are thus made to traverse the porous structure A right through, whilst being isolated from the cavity 4 by reason of their passage through the bearings 6. In order to avoid a mixture between the product to be treated and the filtrate via the porosity of the plates $A_1$, $A_2$, the channels 8 are rendered tight, or sealed, with the aid of a suitable product, identical, or not, to the one having served to bond the bearings 6 together. By way of example, the tightness of the channels 8 may be effected from a thermofusible polymer of fluorinated type or not, a resin, enamels or glasses. It should be noted that the walls of the channels 8 may be rendered tight with the aid of an added non-porous element.

According to a feature of the invention, the cavity 4 communicates with the outer face $b_2$ of the plate $B_1$ via at least one conduit 12 also traversing the reinforcement 11, with a view to constituting a second circulation network $R_2$ which is tight or independent with respect to the first network $R_1$. In this example, the filtrate recovered in the chamber 4 may be conducted on the outer face $b_2$ of the porous structure $B_1$. The surface or wall of the conduits 12 is rendered tight, or sealed, with the aid of an added non-porous element or a sealing product identical, or not, to the one coating the walls of the channels 8, so as to obtain two circulation networks independent of one another.

Figure 4:
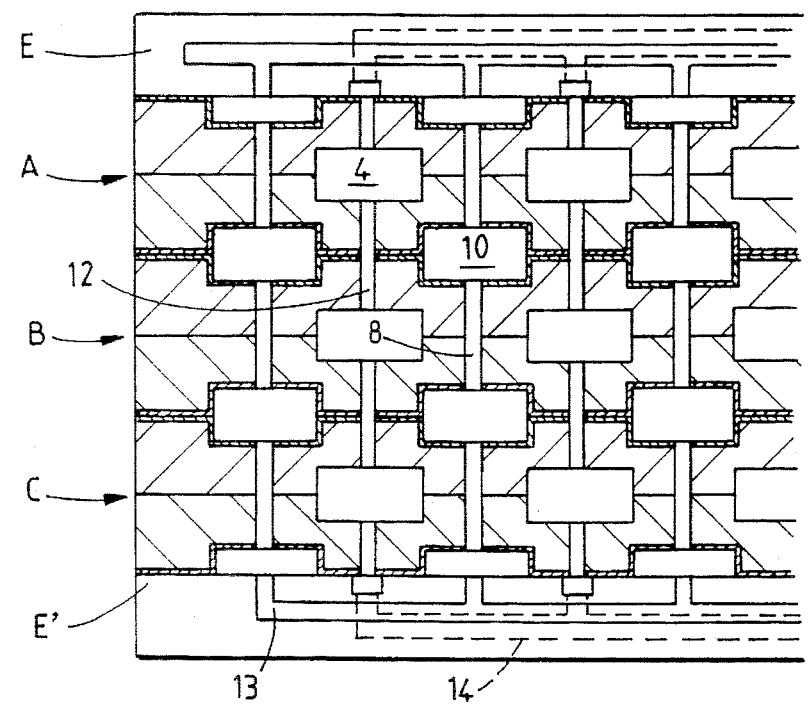
Figure 5:
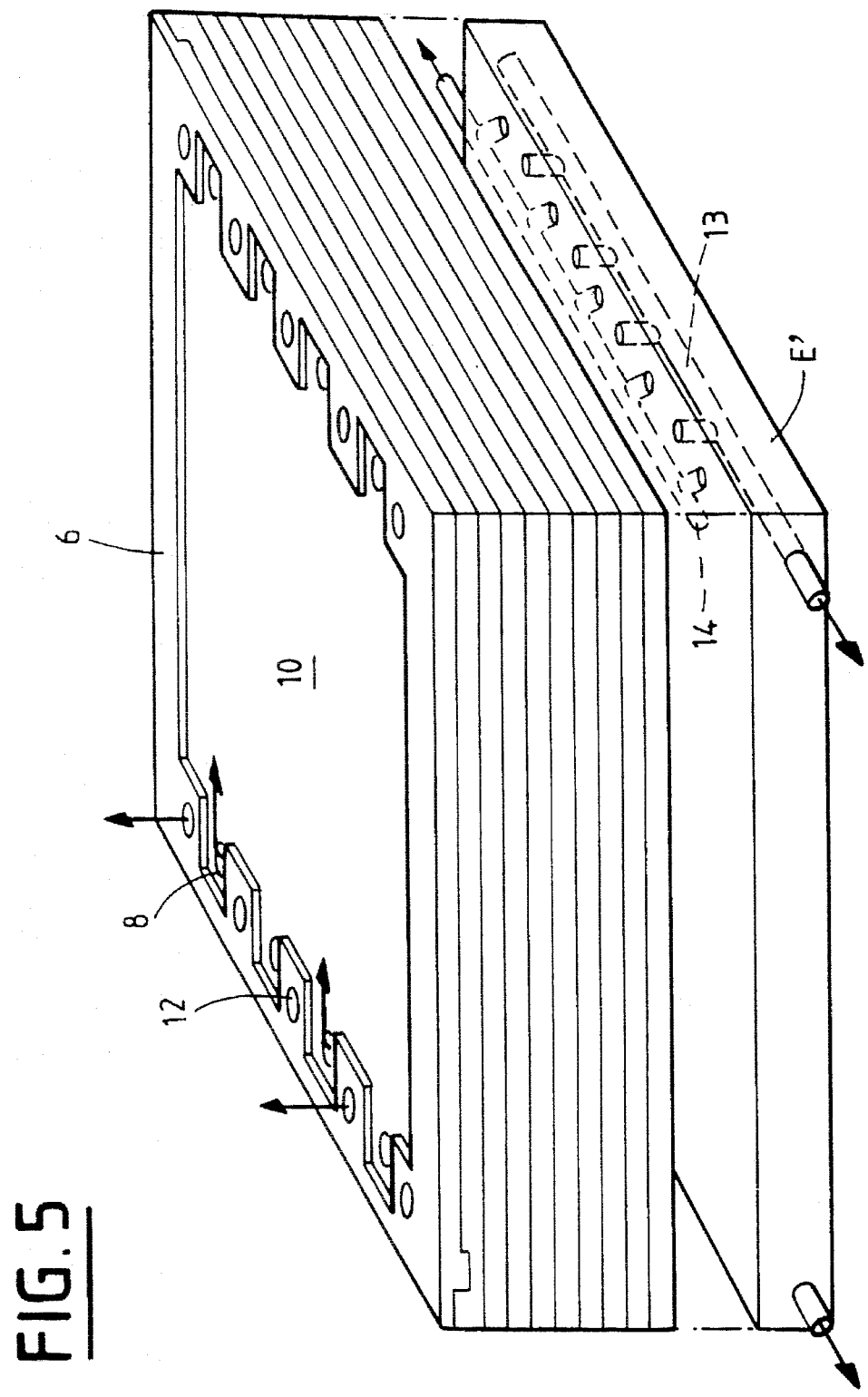
FIG. 5 is a view in perspective showing a filtration unit according to the invention.

According to another variant embodiment of the invention, as illustrated in FIGS. 4 and 5, it may be envisaged to produce a filtration unit comprising a stack of at least two and, in the example illustrated, three identical, inorganic, rigid, porous structures A, B and C. Cavities 4 of the porous structures A, B and C communicate together via conduits 12, while chambers 10 of the porous structures A, B and C communicate together via channels 8. There are thus created directly inside the filtration unit in the form of a cassette, two tight networks $R_1$ and $R_2$ respectively for the circulation of the liquid medium to be treated and of the filtrate. Of course, the function of networks $R_1$ and $R_2$ may be inverted so that networks $R_1$ and $R_2$ ensure the circulation of the filtrate and of the liquid medium to be treated, respectively.

The end elements E, E' may advantageously constitute metallic retention plates whose role is to allow the admission and exit of the fluid to be treated in network $R_1$ and to collect the filtrate coming from network $R_2$. According to a feature of the invention, these thrust E and counter-thrust E' plates are made of an inorganic rigid material in which are arranged pipes 13 for admission and return of the liquid medium to be treated and one or more pipes 14 for recovering the filtrate. In order to avoid mixture between the fluids of the two networks, the inorganic thrust and counter-thrust plates E and E' are made of an inorganic matter of zero porosity. For the same purpose, it may be envisaged to coat all the surfaces of the pipes with a sealing product. The thrust and counter-thrust plates E and E' are fixed on the bearings 6 or reinforcements 11 with the aid of an appropriate material.

The inorganic filtration unit thus produced, called a brick, is formed by a stack of inorganic plates, for example in a number of the order of 10 to 15, allowing manufacture thereof in accordance with an industrial process. Such a brick, by its design, directly integrates the communication passages between the network for circulation of the fluid to be treated and the network for recovering the filtrate by employing the bearings 6 and the reinforcements 11 which ensure a respective tight passage of the channels 8 and conduits 12. The bearings 6 and reinforcements 11 perform an additional function which is that of ensuring the mechanical strength of each porous structure when it works in compression. The cross-section of the bearings and reinforcements as well as their number are defined so that the surface of the porous structure, outside the bearings and reinforcements, is deformed by a quantity less than the deformation of rupture.

It should be considered that the employment of the reinforcements 11 and bearings 6 on the opposite faces of the porous structures allows the latter to withstand an unblocking counter-pressure applied in the cavity or cavities 4. This pressure, opposite with respect to that of transfer, enables the materials deposited on the separating layers 3 to be detached. The bearings 6 and reinforcements 11 thus perform a function of mechanical strength of the porous structures and a function of tight passage between the network of the liquid medium to be treated and the filtrate.

The bearings 6 and reinforcements 11 may be opposite one another or offset from one face to the other of a porous structure. These bearings 6 or reinforcements 11 thus make it possible to reduce the surface of action of the pressure by limiting the force and, consequently, the bend applied. The geometry and arrangement of the bearings and reinforcements 11 therefore depend on the bending characteristics of the material of the porous structures and on the transfer and unblocking pressures. They may be disposed in the form of peripheral bands, completed if necessary by punctual bearings or reinforcements $6_2$.

It should be noted that the arrangement of the bearings 6 and reinforcements 11 imposes that of the channels 8 and conduits 12. It may thus be provided to produce, for example, n passages aligned along at least one of the sides of the plate, combined, or not, with n passages aligned along at least one perpendicular axis. In the illustrated example, conduits 12 and channels 8 are made along two opposite sides of the porous structure and are aligned in a direction substantially parallel to the sides.

POSSIBILITY OF INDUSTRIAL APPLICATION

The filtration unit according to the invention is adapted to concentrate, sort or extract molecular or particulate species contained in a liquid medium which exerts a given pressure on the membrane. The unit according to the invention may thus be used in the domain of nano-filtration, ultra-filtration, micro-filtration, filtration or reverse osmosis.

I claim:

1. A filtration unit for filtering a liquid medium comprising:

a first inorganic rigid, porous structure having first and second opposing principal faces, said structure having a first internal cavity formed by bearing means providing a seal about said first internal cavity;

at least one separating layer provided on at least one of said first and second principal faces, each of said at least one separating layer having an associated porosity which is less than a porosity associated with said structure;

means for supplying a liquid medium to be filtered to at least one of said first and second principal faces of said structure;

a first channel extending through said structure and said at least one separating layer and opening at each of said first and second principal faces, said channel extending through said structure at said bearing means; and, means for fluidly sealing said first channel, within said structure, relative to said first internal cavity such that said first channel forms a first circulation network.

2. The filtration unit according to claim 1, further comprising a second inorganic, rigid, porous structure defining a third face positioned against one of said first and second principal faces, said third face including at least one recessed chamber defined by a plurality of reinforcements, said at least one chamber being in fluid communication with said first channel so as to be part of said first circulation network.

3. The filtration unit according to claim 2, further comprising a first conduit which extends from within said second structure, into said first structure and opens into said first internal cavity, said first conduit forming part of a second circulation network, and means for fluidly sealing said first conduit with respect to said first circulation network.

4. The filtration unit according to claim 3, wherein said filtration unit further comprises a second internal cavity located within said second structure and a second conduit extending through said second structure and opening into said second internal cavity, said second conduit being in fluid communication with said first conduit so as to form part of said second circulation network, and means for fluidly sealing said second conduit relative to said first circulation network.

5. The filtration unit according to claim 3, wherein said means for fluidly sealing said first channel comprises a tube.

6. The filtration unit according to claim 3, wherein said means for fluidly sealing said first channel and said first conduit includes a sealing product coating on internal surfaces of said first channel and said first conduit.

7. The filtration unit according to claim 3, wherein said bearing means and at least some of said plurality of reinforcements define peripheral, interconnecting borders for said first and second inorganic, rigid porous structures, respectively.

8. The filtration unit according to claim 1, further comprising first and second nonporous end elements respectively arranged juxtaposed to said first and second principal faces.

9. The filtration unit according to claim 8 wherein said supplying means comprises a first pipe extending within at least one of said end elements for delivering a liquid medium to be filtered to said filtration unit and a second pipe for recovering a filtrate from said filtration unit, one of said first and second pipes being part of said first circulation network and another of said first and second pipes being part of said second circulation network.

10. The filtration unit according to claim 9, wherein said first and second end elements constitute inorganic, rigid plates.

* * * * *